(12) United States Patent
Quarre et al.

(10) Patent No.: US 9,857,580 B2
(45) Date of Patent: Jan. 2, 2018

(54) APPARATUS FOR HOLDING A SUBSTRATE WITHIN A SECONDARY DEVICE

(71) Applicant: RareCyte, Inc., Seattle, WA (US)

(72) Inventors: Steve Quarre, Woodinville, WA (US); David Stewart, Seattle, WA (US)

(73) Assignee: RareCyte, Inc., Seattle, WA (US)

( * ) Notice: Subject to any disclaimer, the term of this patent is extended or adjusted under 35 U.S.C. 154(b) by 180 days.

(21) Appl. No.: 14/718,381

(22) Filed: May 21, 2015

(65) Prior Publication Data

US 2015/0346476 A1    Dec. 3, 2015

Related U.S. Application Data

(60) Provisional application No. 62/004,417, filed on May 29, 2014.

(51) Int. Cl.
| | | |
|---|---|---|
| *G02B 21/24* | (2006.01) | |
| *G02B 21/26* | (2006.01) | |
| *G02B 21/34* | (2006.01) | |

(52) U.S. Cl.
CPC ............. *G02B 21/34* (2013.01); *G02B 21/24* (2013.01); *G02B 21/26* (2013.01)

(58) Field of Classification Search
CPC ......... G02B 21/26; G02B 21/34; G02B 21/24
USPC .......................................................... 359/391
See application file for complete search history.

(56) References Cited

U.S. PATENT DOCUMENTS

| | | | |
|---|---|---|---|
| 4,012,112 A | | 3/1977 | Masterson |
| 5,659,421 A | * | 8/1997 | Rahmel ................. G02B 21/26 359/391 |
| 7,403,330 B2 | | 7/2008 | Henderson et al. |
| 7,948,676 B2 | * | 5/2011 | Virag ..................... G01N 35/04 359/368 |
| 2015/0138632 A1 | | 5/2015 | Mikhailov |

* cited by examiner

*Primary Examiner* — Thomas K Pham
*Assistant Examiner* — Mitchell Oestreich

(57) ABSTRACT

This disclosure is directed to an apparatus for securely holding a substrate, such as a microscope slide. A holder includes a frame including at least three walls, such as a base, a first arm, and a second arm. Each wall includes a platform or a portion of a platform to support the substrate. The first arm includes at least one securing block and a second arm opposite the first arm includes a secure bar with a securing block. The securing blocks include a ramp to guide the substrate off of the platforms and a stopper to set a maximum lift distance and to constrain the substrate.

18 Claims, 5 Drawing Sheets

APPARATUS FOR HOLDING A SUBSTRATE WITHIN A SECONDARY DEVICE

CROSS-REFERENCE TO A RELATED APPLICATION

This application claims the benefit of Provisional Application No. 62/004,417, filed May 29, 2014.

TECHNICAL FIELD

This disclosure relates generally to an apparatus for holding a substrate and, in particular, to an apparatus for securely holding a microscope slide on or within an imaging device.

BACKGROUND

Analysis of a biological sample includes the step of imaging the biological sample on a substrate, such as a microscope slide. To image, the substrate may be placed on a stage and the stage may be moved relative to an objective. Alternatively, the objective may be moved relative to the stage. However, when the substrate is not consistently secured in a repeatable, predictable manner regardless of substrate inconsistencies or deformities, the images which may vary from substrate to substrate and may be difficult to determine proper surface locations.

As a result, practitioners, researchers, and those imaging samples on substrates continue to seek an apparatus for consistently, repeatably, and predictably securing substrates of varying inconsistencies or deformities. The apparatus, by not deforming the surface or imparting moments on the substrate due to the kinematic nature, may accommodate a wide variety of substrates based on size, shape, and configuration.

DETAILED DESCRIPTION

This disclosure is directed to an apparatus for securely holding a substrate, such as a microscope slide. A holder includes a frame including at least three walls, such as a base, a first arm, and a second arm. Each wall includes a platform or a portion of a platform to support the substrate. The first arm includes at least one securing block and a second arm opposite the first arm includes a secure bar with a securing block. The securing blocks include a ramp to guide the substrate off of the platforms and a stopper to set a maximum lift distance and to constrain the substrate. The secure bar may opened and closed, such that when in an open position, the secure bar permits the substrate to slide freely into and out the holder; and when in a closed position, the securing block on the secure bar and the at least one other securing block exert forces on the substrate to secure the substrate within the holder.

Holder

For the sake of convenience, the holder 100 is described with reference to a U-shape frame as an example frame. But the frame described below is not intended to be so limited in its scope of application. The frame, in practice, may be a four-walled frame (i.e. a main body with a cavity extending through the main body), J-shaped, or the like.

Figure 1A:
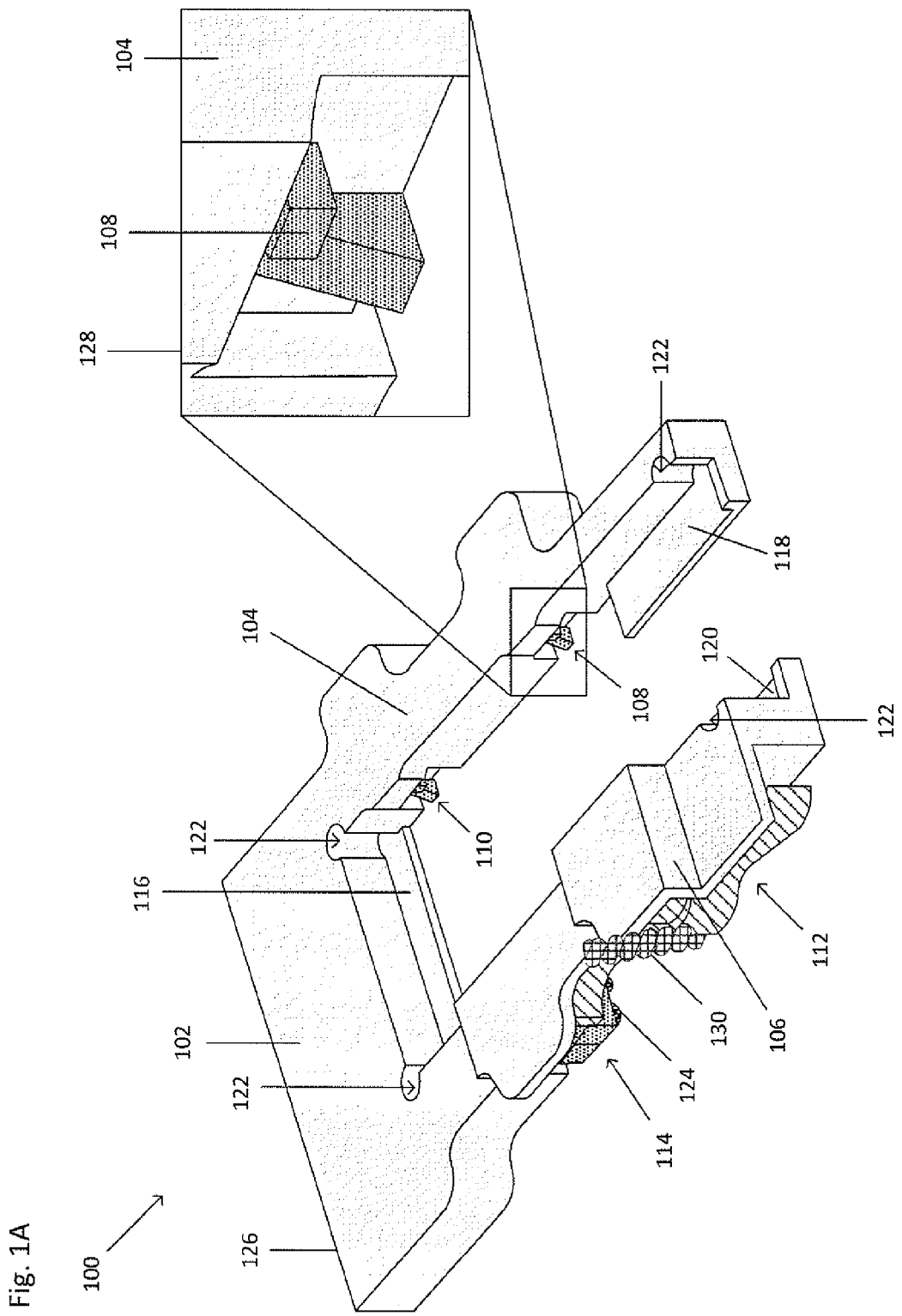
FIG. 1A-1C show an example holder.
Figure 1B:
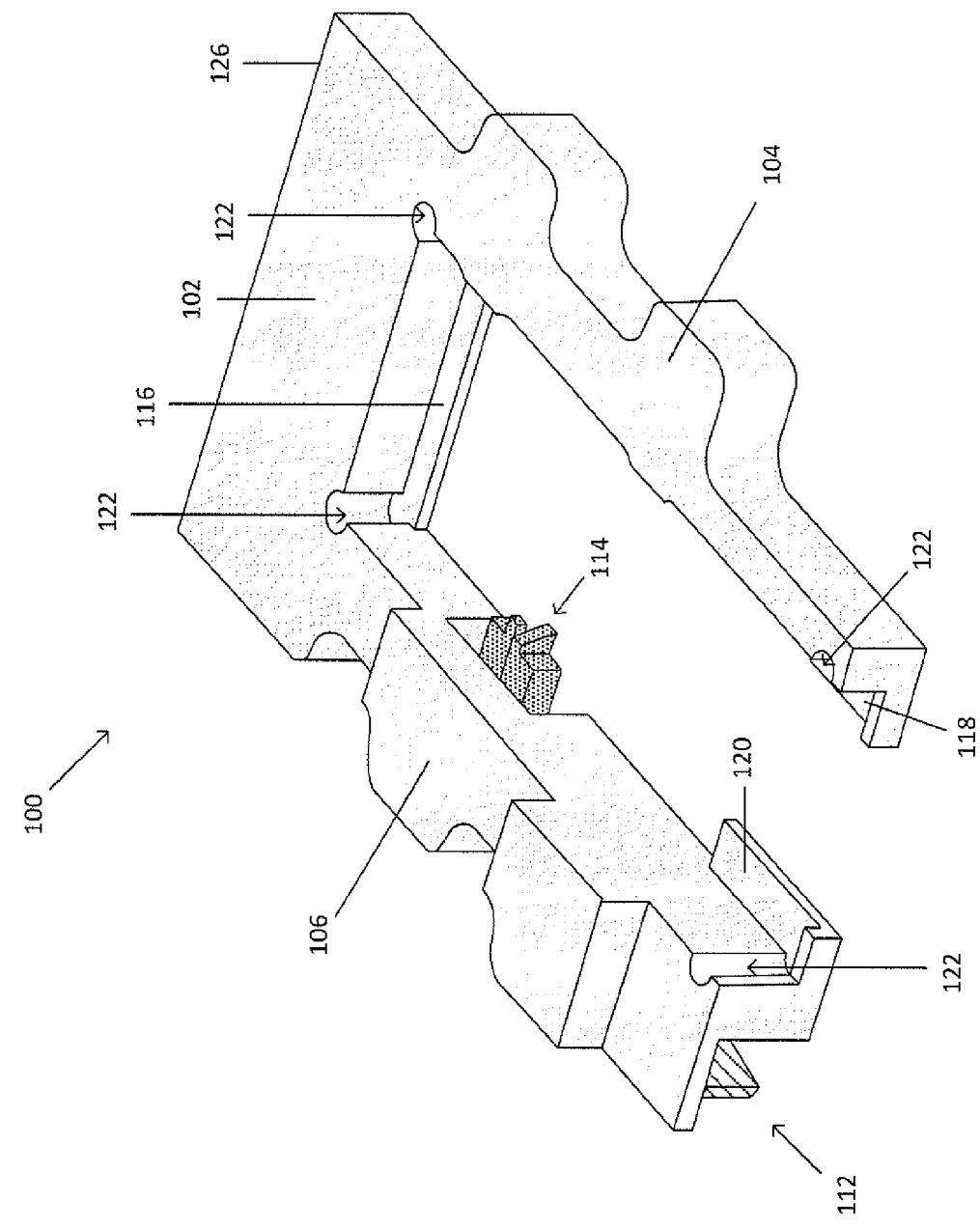
Figure 1C:
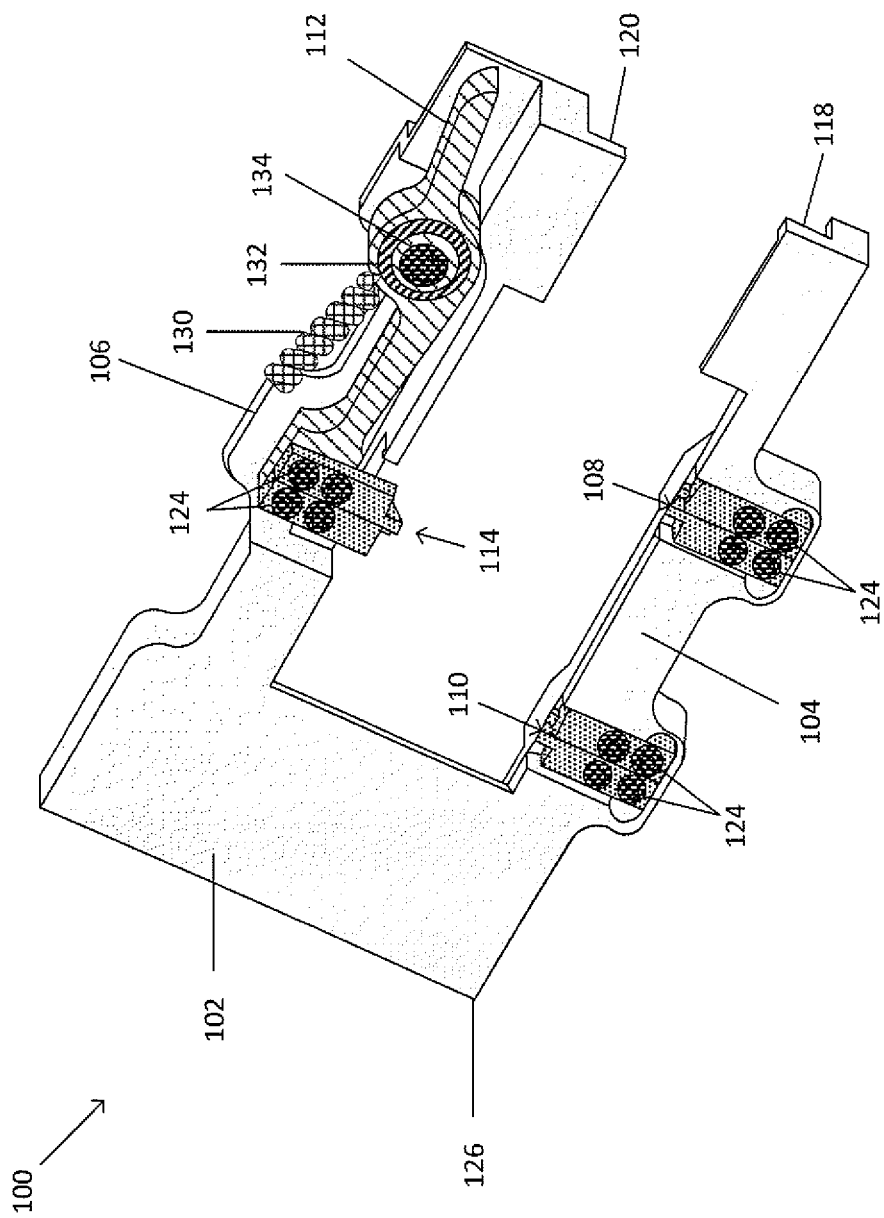

FIGS. 1A-1C shows isometric views of a holder 100 to securely hold a substrate, such as a microscope slide. The holder 100 includes a frame 126 including a base 102, a first arm 104, and a second arm 106. The first arm 104 includes a proximal end connected to a first end of the base 102 and a distal end extending from the base 102. The second arm 106 includes a proximal end connected to a second end of the base 102 and a distal end extending from the base 102. The base 102 includes a base platform 116 extending in the same direction as the first and second arms 104 and 106 to support a portion of the substrate. The first arm 104 may include a first platform 118 at the distal end and extending toward the second arm 106 to support a portion of the substrate. The second arm 106 may include a second platform 120 at the distal end and extending toward the first arm 104 to support a portion of the substrate. The first and second platforms 118 and 120 may be adjoined, thereby forming a single platform and connecting the first and second arms 104 and 106 at the distal ends of the first and second arms 118 and 120. The base platform 116, the first platform 118, and the second platform 120 may be located on the same plane. Alternatively, the first and second platforms 118 and 120 may be located at any point between the distal and proximal ends of the first and second arms 104 and 106, respectively.

The first arm 104 also includes first and second securing blocks 108 and 110 to provide first and second points of contact, respectively, for the substrate during imaging, processing, holding, or the like. The first and second securing blocks 108 and 110 guide the substrate off of the platforms and constrain the substrate at the first and second contact points, respectively. Snapshot 128 shows a magnified view of the first securing block 108. The first and second securing blocks 108 and 110 may be attached to the first arm 104 by at least one fastener 124 (i.e. a screw, a nail, a peg, a pin, a nut and bolt, a dowel, a staple, a rivet, or the like), by an adhesive, by welding, or the like. Alternatively, the first and second securing blocks 108 and 110 and the first arm 104 may be formed as a single piece, such as by molding, machining, or the like.

The holder 100 also includes a secure bar 112 attached to the second arm 106 by a bearing 132 and a fastener 134. A third securing block 114, to provide a third point of contact for the substrate during imaging, processing, holding, or the like, may be attached to or may be formed as a part of the secure bar 112. The third securing block 114 guides the substrate off of the platforms and constrains the substrate at a third point. Furthermore, the three contact points imparted by the securing blocks 108, 110, and 114 provide for a kinematic mount. The bearing 132 allows the secure bar 112 to move relative to the second arm 106 into open and closed positions. When in the open position, the secure bar 112 penults the substrate to freely slide into and out the holder 100; and when in the closed position, the third securing block 114 on the secure bar 112 and the first and second securing blocks 108 and 110 exert forces on the substrate to secure the substrate within the holder 100. A spring 130 may also be included and may extend from the secure bar 112 to the second aim 106 to pre-load the secure bar 112.

The holder 100 may also include cutouts 122 on an inner corner where the proximal ends of the first and second arms 104 and 106 meet the base 102. There may also be cutouts 122 at the distal ends of the first and second arms 104 and 106. The cutouts 122 permit for any appropriately sized substrate to be used since the corners of the substrate may fit within the cutouts 122 instead of breaking off or chipping when being placed into the holder 100. The holder 100 may be composed of ceramic, glass, plastic, metal, or combinations thereof.

The holder 100 may be attached to a secondary device for imaging and/or processing by an attachment mechanism (i.e. a screw, a nail, a peg, a pin, a nut and bolt, a dowel, a staple, a rivet, or the like), by an adhesive, by welding, by clips, by detents, by tongue and groove joint, or the like. The holder 100 may include at least one hole to accommodate the attachment mechanism for proper, secure attachment to the secondary device.

Figure 2A:
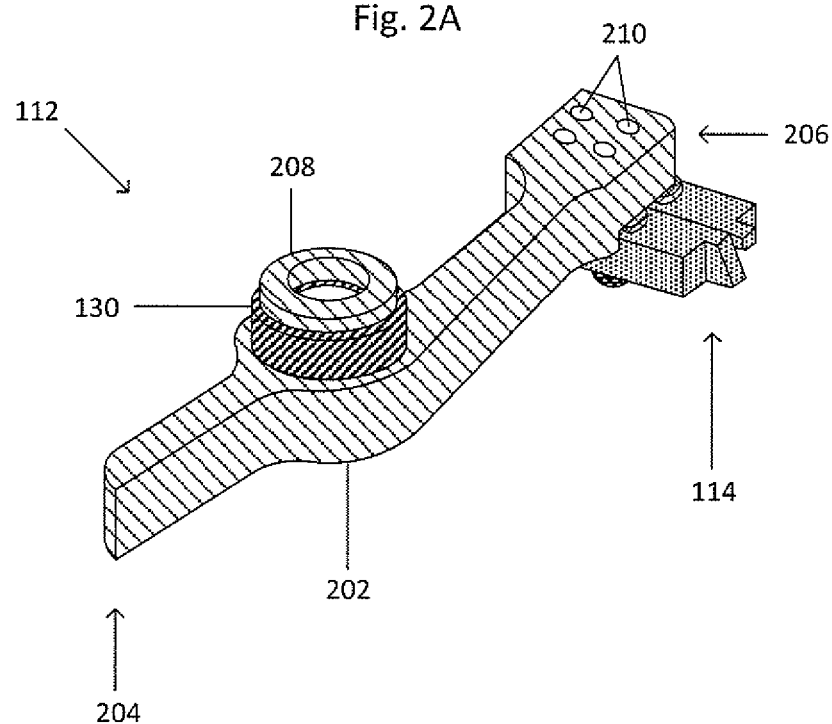
FIGS. 2A-2B show an example secure bar.
Figure 2B:
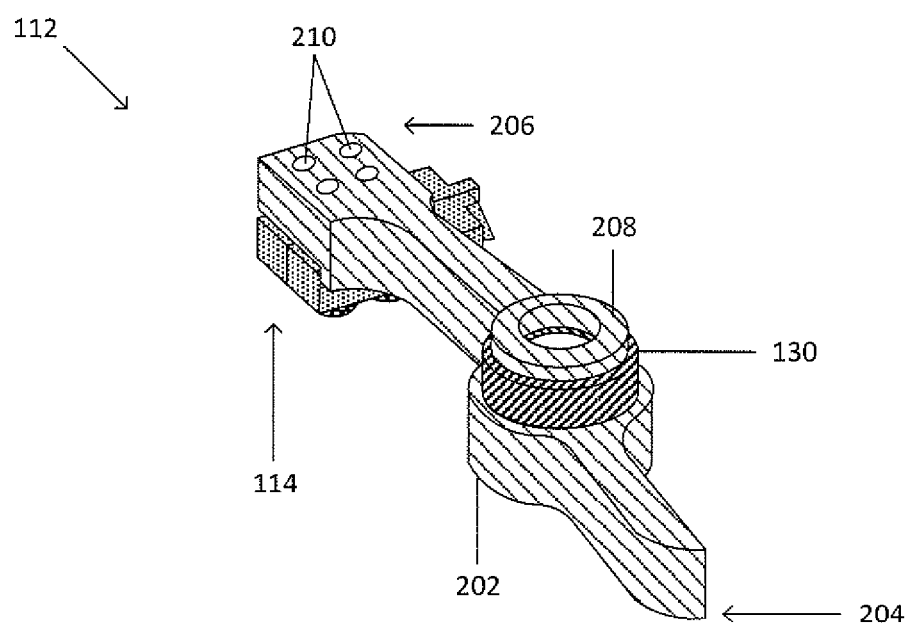

FIGS. 2A-2B show isometric views of the secure bar 112 with the third securing block 114 attached to the secure bar 112. The secure bar 112 includes a main body 202 having a first end 204 and a second end 206. The second end 206 may include at least one bore 210 extending at least partially through the second end 206 to accept the at least one fastener 124 to attach the third securing block 114 to the secure bar 112. The first end 204 includes a handle or grip to permit a force to be exerted on the main body 202 so as to move the secure bar 112 into the open and closed positions when it is desirous to do so. The secure bar 112 also includes the bearing 132 to move the main body 202 relative to the second arm (not shown) when exerting a force on the first end 204. Alternatively, the bearing 132 may be inserted into a cavity (not shown) in the second arm and the secure bar 112 may then be joined with the bearing 132 to allow for movement. The secure bar 112 may be moved into the open and closed positions when it is desirous to do so. The secure bar 112 may also include a Belleville spring 208 to pre-load to a bearing 128 and reduce movement of the bearing 128. The bearing 128 may be a single bearing or more than one bearing connected to allow for rotational movement.

Figure 3:
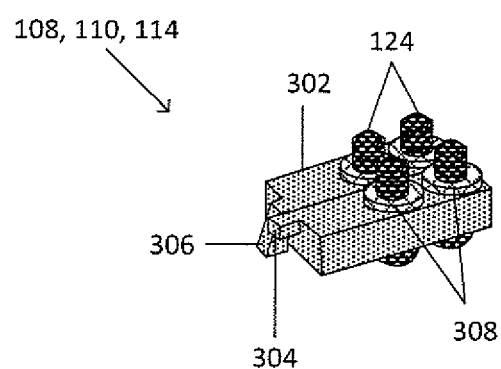
FIG. 3 shows an example securing block.

FIG. 3 shows an isometric view of the securing blocks 108, 110, and 114. The securing blocks 108, 110, and 114 provide a controlled references surface for the substrate during imaging, processing, holding, or the like. The securing blocks 108, 110, and 114 include a main body 302 with a stopper 304 and a ramp 306, both of which extend from the same side of the main body 302. When the secure bar (not shown) is moved into a closed position, the ramp 306 guides the substrate up and off of the platforms (not shown) and the stopper 304 sets a maximum lift distance and constrains the substrate. When the secure bar (not shown) is moved into an open position, the ramp 306 guides the substrate down and towards the platforms (not shown). The main body 302 may include at least one hole (not shown) to accept the at least one fastener 124 to attach to the second end of the secure bar (not shown). The main body 302 may be a single piece or may be two pieces. When the main body 302 is two pieces, a first piece includes the stopper 304 and a second piece includes the ramp 306. The securing blocks 108, 110, and 114 may also include at least one height adjuster 308, such as a shim, to adjust the heights of the securing blocks 108, 110, and 114 relative to the frame (not shown) of the holder (not shown).

The ramp 306 may be any appropriate shape, including, but not limited to, triangular, hemispherical, parabolic, trapezoidal, or the like.

Method

For the sake of convenience, the methods are described with reference to a slide as an example substrate. But the methods described below are not intended to be so limited in their scope of application. The methods, in practice, may be used with any kind of substrate including, but not limited to, a well plate.

First, the slide is inserted into the holder and placed onto the first, second, and base platforms with the secure bar in the open position. Second, the secure bar is moved into the closed position. The third securing block pushes the slide against the first and second securing blocks. The ramps of the respective securing blocks lift the slide up and off of the platforms. The stoppers of the respective securing blocks set the maximum lift distance for the slide and constrain the slide, thereby inhibiting any rotation. When the secure bar is set in the closed position, the force exerted on the slide by the securing blocks inhibits translational movement of the slide relative to the holder. Furthermore, the alignment and/or numbers of securing blocks may cause at least one slide surface to be planar and to be perpendicular relative to an objective of an imaging device. Once the slide is secured, the slide may be imaged. After imaging, the secure bar may be moved into the open position to release the forces on the slide. The ramps of the respective securing blocks guide the slide down and onto the first, second, and base platforms. The slide may then be removed from the holder and another slide inserted to restart the process.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

We claim:

1. A device comprising:
   a base comprising a base platform to support a portion of a substrate;
   a first arm comprising
     a proximal end connected to a first end of the base,
     a distal end extending from the base,
     at least one securing block, and
     a first platform to support another portion of the substrate; and
   a second arm comprising
     a proximal end connected to a second end of the base,
     a distal end extending from the base,
     a secure bar comprising a securing block; and
     a second platform to support another portion of the substrate,
   wherein the base platform and the first and second arms extend in the same direction from the base,
   wherein each securing block comprises a ramp and a stopper, and
   wherein the first platform extends towards the second arm and the second platform extends towards the first arm, and
   wherein each securing block further comprises a main body comprising the ramp and the stopper, wherein the ramp and the stopper extend from the same side of the main body, wherein the ramp is shaped to lift the substrate off the platforms and the stopper sets the maximum lift distance for the substrate and constrains the substrate.

2. The device of claim 1, wherein the first arm comprises two securing blocks.

3. The device of claim 2, wherein the securing blocks on the first arm and the securing block on the secure bar provide three points of contact for the substrate when the secure bar is in a closed position.

4. The device of claim 1, wherein the base platform, first platform, and second platform are adjoined to form a single platform.

5. The device of claim 1, wherein the base, the first arm, and the second arm form a U-shape.

6. The device of claim 1, wherein the base, the first arm, and the second arm form a J-shape.

7. The device of claim 1, further comprising a spring extending from the secure bar to the second arm to pre-load the secure bar.

8. The device of claim 1, further comprising at least one cutout on an inner corner at the proximal ends of each of the first and second arms where the first and second arms are connected to the base, the at least one cutout to accept a portion of the substrate.

9. The device of claim 8, further comprising at least one cutout at the distal end of each of the first and second arms.

10. The device of claim 1, wherein each of the securing blocks comprises at least one height adjuster to adjust the height of each securing block relative to the alai or secure bar to which the securing block is attached and at least one fastener for fastening the securing blocks to the second arm or the secure bar.

11. The device of claim 1, wherein the secure bar is attached to the second arm by a bearing and a fastener.

12. The device of claim 11, secure bar further comprising:
an open position to insert the substrate into or remove the substrate from the holder; and
a closed position to constrain the substrate against the securing blocks.

13. A method comprising:
inserting a substrate into a holder, the holder comprising:
a base comprising a base platform to support a portion of the substrate;
a first arm comprising
a proximal end connected to a first end of the base,
a distal end extending from the base,
at least one securing block, and
a first platform to support another portion of the substrate; and
a second arm comprising
a proximal end connected to a second end of the base,
a distal end extending from the base,
a secure bar comprising a securing block; and
a second platform to support another portion of the substrate,
wherein the base platform and the first and second arms extend in the same direction from the base,
wherein each securing block comprises a ramp and a stopper, and
wherein the first platform extends towards the second arm and the second platform extends towards the first arm; and
moving the secure bar from an open position to a closed position, thereby constraining the substrate against the securing blocks, and
wherein the moving step causes the ramps of the securing blocks to lift the substrate up and off of the base, first, and second platforms, and wherein the stoppers of respective securing blocks set the maximum lift distance for the substrate and constrain the substrate.

14. The method of claim 13, wherein the base, the first arm, and the second arm form a U-shape or a J-shape.

15. The method of claim 13, wherein the first arm comprises two securing blocks.

16. The method of claim 15, wherein the securing blocks on the first arm and the securing block on the secure bar provide three points of contact for the substrate when the secure bar is in the closed position.

17. The method of claim 13, wherein each of the securing blocks comprises at least one height adjuster to adjust the height of each securing block relative to the arm to which the securing block is attached and at least one fastener for fastening the securing blocks to the second arm or the secure bar.

18. The method of claim 13, wherein the open position permits the substrate to be inserted into or removed from the holder.

* * * * *